United States Patent [19]

Hanusa

[11] 3,906,068

[45] Sept. 16, 1975

[54] PROCESS FOR CONTINUOUSLY PRODUCING FOAMED MATERIAL OF RECTANGULAR SHAPE

[75] Inventor: Helmut G. Hanusa, Cape Girardeau, Mo.

[73] Assignee: Textron, Inc., Providence, R.I.

[22] Filed: Dec. 13, 1973

[21] Appl. No.: 426,712

[52] U.S. Cl. .................. 264/51; 264/54; 264/216; 264/313
[51] Int. Cl.² ........................................ B29D 27/04
[58] Field of Search .......... 264/54, 47, 51, 216, 313

[56] References Cited
UNITED STATES PATENTS

| | | | |
|---|---|---|---|
| 3,123,856 | 3/1964 | Dye et al. ........................... 264/47 |
| 3,325,573 | 6/1967 | Boon et al. ......................... 264/54 |
| 3,476,845 | 11/1969 | Buff et al. ............................ 264/54 |
| 3,488,800 | 1/1970 | Kornylak ......................... 264/54 UX |
| 3,496,596 | 2/1970 | Buff .............................. 264/54 UX |
| 3,729,534 | 4/1973 | Ferstenberg ......................... 264/54 |

*Primary Examiner*—Philip Anderson
*Attorney, Agent, or Firm*—Gravely, Lieder & Woodruff

[57] ABSTRACT

A liquid reaction mixture from which soft cellular material is derived is poured into a moving mold where it begins to expand. Beyond the point at which the reaction mixture is poured, the bottom wall of the mold is deformed between its sides and this causes the expanding mixture to flow laterally so that the mixture expands into a desired configuration. The foregoing process is carried out on a conveyor having an endless belt and rollers for deforming the upper pass of the belt between the sides thereof. The mold is a flexible film material which is supported on and propelled by the belt.

11 Claims, 9 Drawing Figures

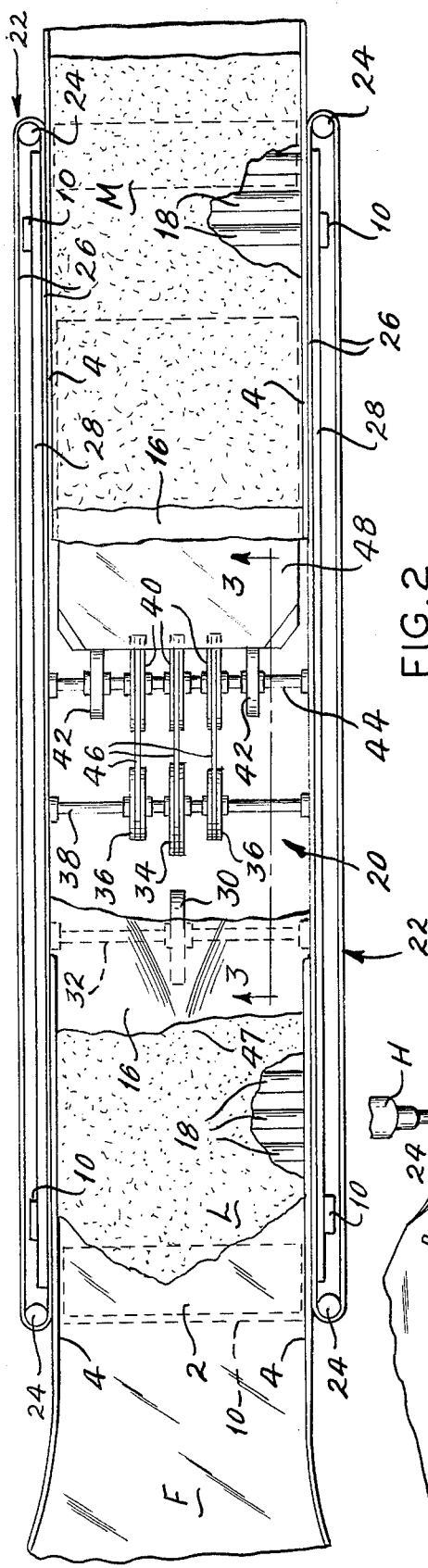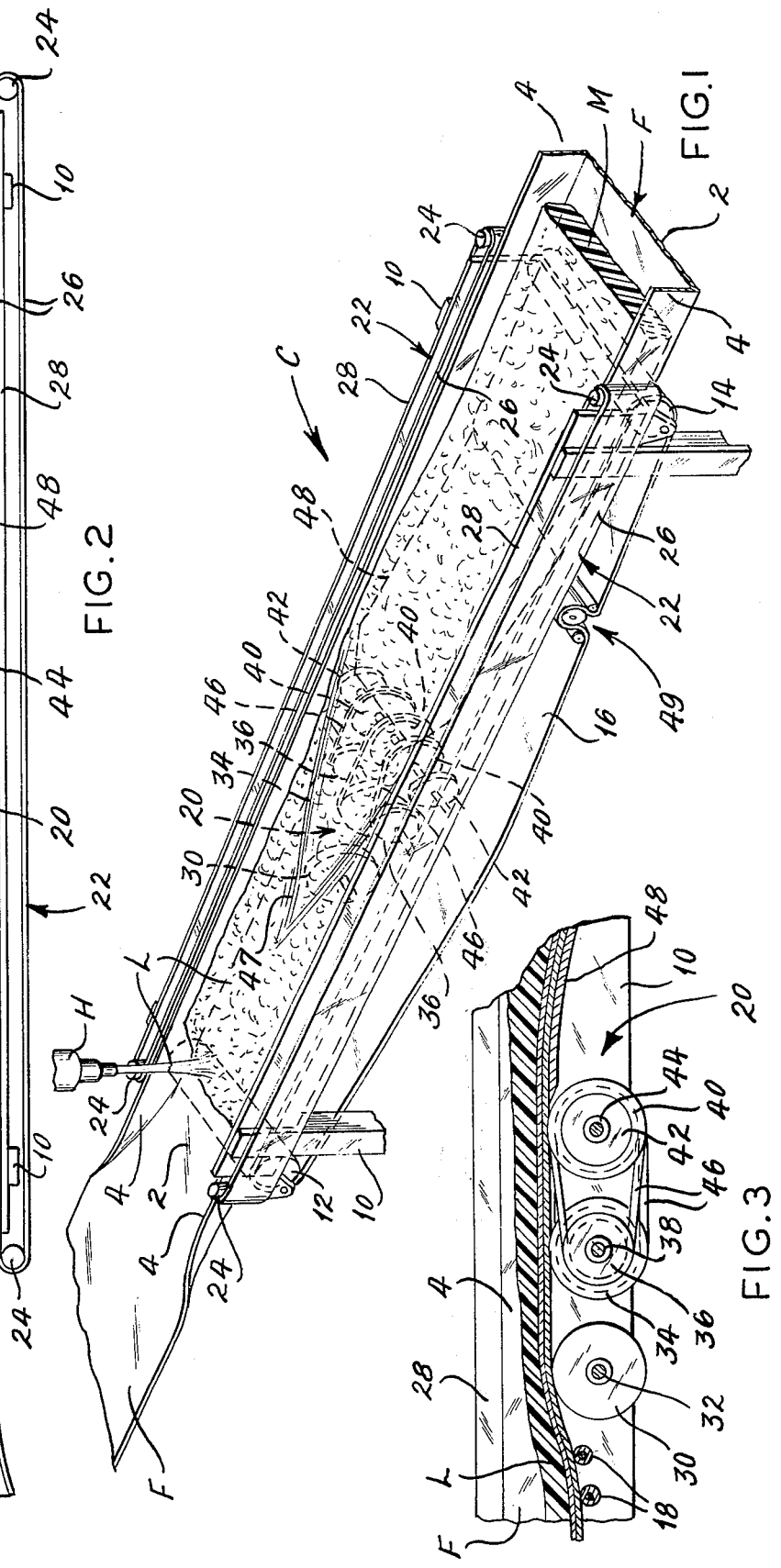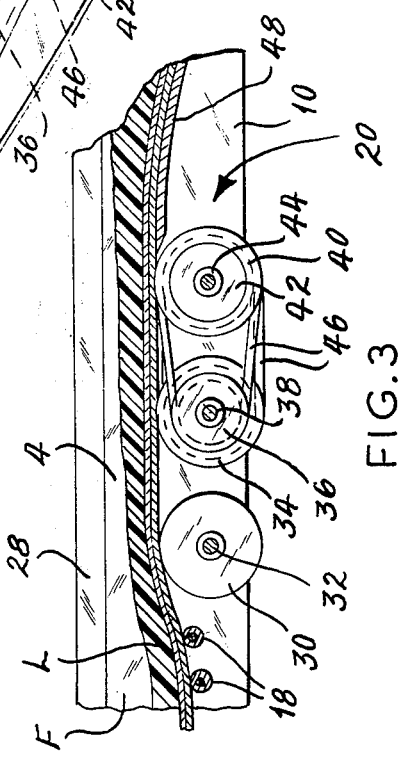

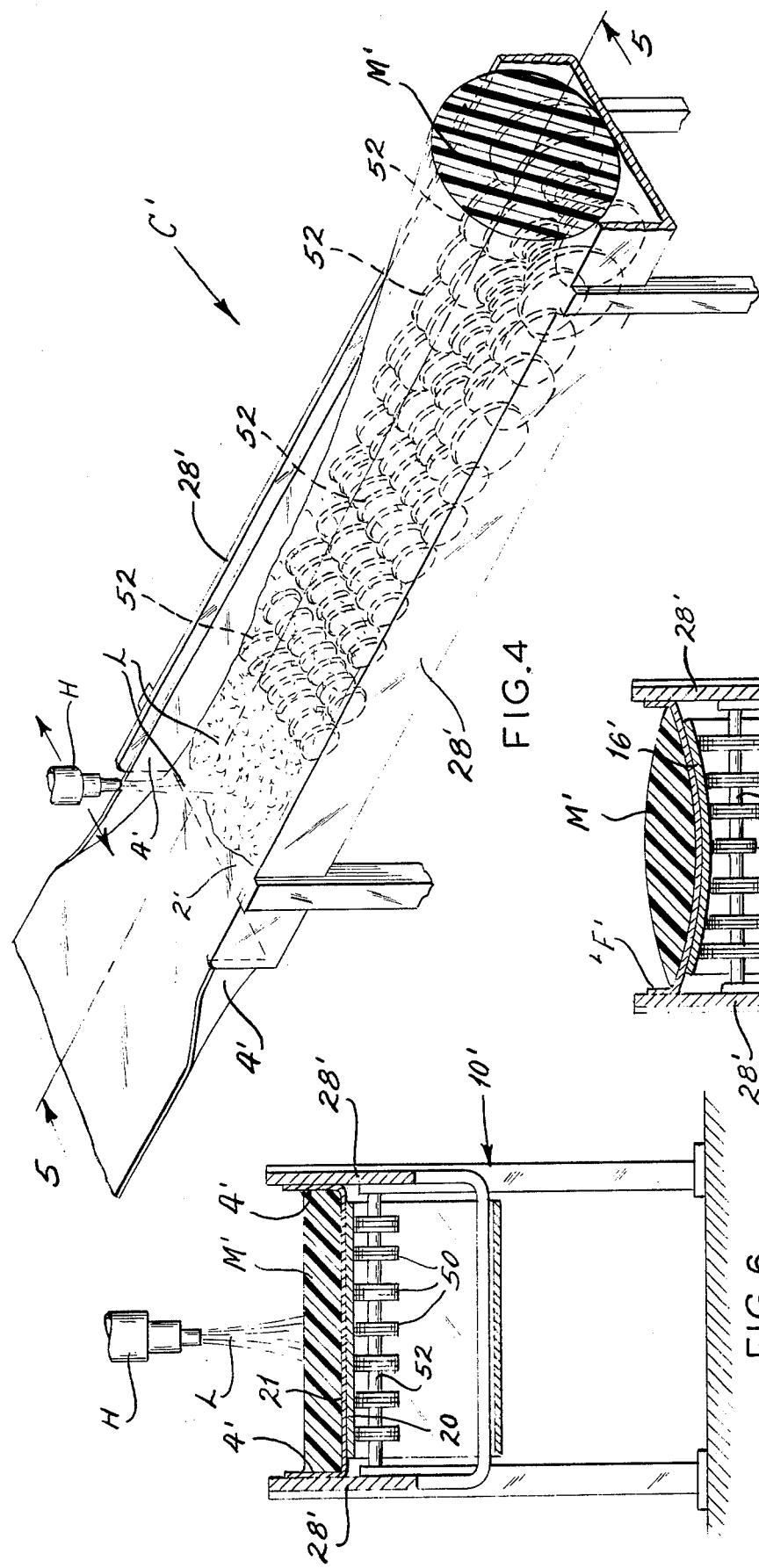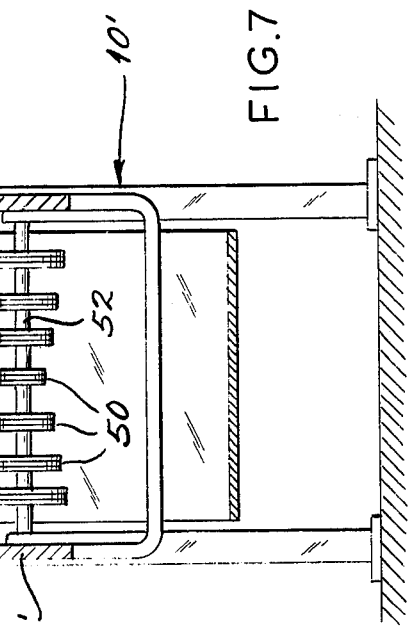

3,906,068

PROCESS FOR CONTINUOUSLY PRODUCING FOAMED MATERIAL OF RECTANGULAR SHAPE

BACKGROUND OF THE INVENTION

This invention relates in general to the production of foamed material and more particularly to a method for casting a foam so that the top surface thereof as well as the bottom and sides have a desired contour.

Foamed synthetic resins such as polyurethane find wide-spread use in a variety of products where cushioning properties are desired. For example, the back and seat cushions of much of the furniture produced today contain foamed or cellular polyurethane, as do many automobile seats. The foam material is initially cast in elongated buns, and in the more advanced processes the casting is continuous. In one process which is widely used, the mold consists of a long strip of paper which is folded into a three-sided configuration and is drawn through a trough. A liquid reaction mixture is poured onto the bottom wall of the paper mold and as the mold continues to move, the reaction mixture expands into a foam or bun which is confined by the paper mold. This rise of the foam at the sidewalls of the mold is less than at the center of mold, due to the friction between the sidewalls and the foam and the tendency of the foam to adhere to those sidewalls. As a result, the foam or bun acquires a convex top surface, commonly referred to as a crown. Also, the liquid reaction mixture tends to remain confined in a channel in the center of the mold and this compounds the tendency of the foam or bun to acquire greater height at its center. Since the greatest demand for foam material is for that possessing a rectangular configuration, the convex top is usually cut off. This requires an additional operation in the process and furthermore the material cut-off constitutes waste.

The continuous casting process has heretofore been used only for producing foam material with flat bottoms and squared off sidewalls and has never been used to create buns of different configurations.

SUMMARY OF THE INVENTION

One of the principal objects of the present invention is to provide a process for casting foam material such that the top surface of that material is substantially flat. Another object is to provide a process and apparatus of the type stated in which the contour of the top surface may be varied between convex and concave configurations. A further object is to provide an apparatus and process of the type stated which is simple to use. These and other objects and advantages will become apparent hereinafter.

The present invention is embodied in a process for casting a cellular material from a liquid reaction mixture, and that process involves pouring the liquid reaction mixture into a mold and changing the configuration of the mold as the mixture expands and before the expanding mixture takes on a permanent set. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a perspective view of a foam casting conveyor for casting a bun having a generally rectangular configuration.

FIG. 2 is a fragmentary top view of the conveyor with the belt broken away to show the means for deforming it;

FIG. 3 is a sectional view taken along lines 3—3 of FIG. 2;

FIG. 4 is a perspective view of a modified foam casting conveyor for casting a bun having a generally circular configuration;

FIGS. 6, 7, 8 and 9 are sectional views taken along lines 6—6, 7—7, 8—8, and 9—9, respectively of FIG. 5.

DETAILED DESCRIPTION

Figure 5:
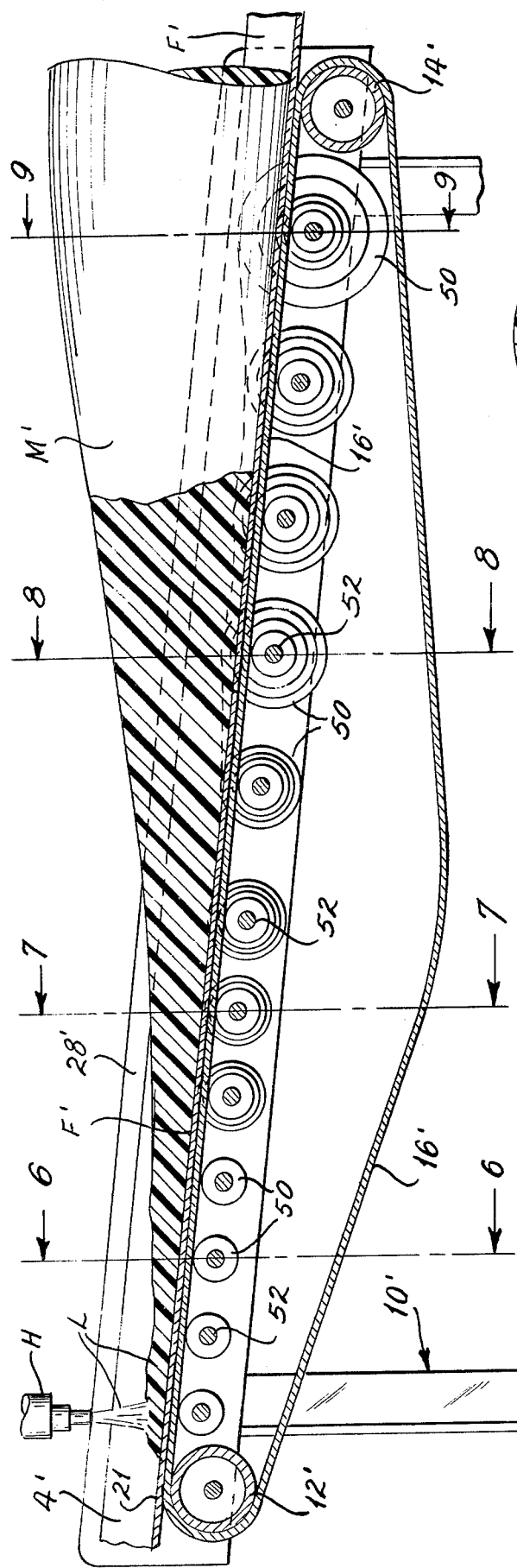
FIG. 5 is a sectional view taken along lines 5—5 of FIG. 4.

Referring now to the drawings (FIG. 1), C designates a conveyor for casting a foam material M, and that foam material is derived from a liquid reaction mixture L which is supplied through a mixing head H. The conveyor C may be adjusted to vary the contour of the surfaces on the foam material M, and among the various contours available is a substantially flat upper, lower, and side surfaces which results in a foam block or bun of rectangular cross section. Such a configuration is desired in many instances. The adjustment also affords convex and concave crowns of varying degree. The mixing head H mixes liquids which react to create liquid reaction mixture L which becomes the cellular or foam material M. It further discharges the liquid reaction mixture onto the conveyor C or more specifically, onto a plastic film F which is folded into a rectilinear three-sided configuration and moves along the conveyor C. Being in the shape of a trough, the folded plastic F has a bottom wall 2 and two sidewalls 4. Polyethylene film is ideally suited for use as the film F. Paper may also be used. To achieve better distribution, the distribution head H may move back and forth across the film F as the film F moves beneath it. The distribution head H is conventional, as are the liquids which are mixed in and dispersed by it.

Actually, the liquid reaction mixture L does not change into a foamed or cellular condition immediately, but instead changes gradually over a period of about 5 to 300 seconds to a fully set cellular condition. Indeed, the mixture remains almost a pure liquid for abour 3 to 5 seconds. Thereafter, it then begins to cream or foam, in which case it expands considerably in volume and becomes cellular in nature. The creaming takes about 5 to 280 seconds and during this time the material is capable of flowing. The flow characteristics, however, become less and less as the creaming period progresses. At the end of the creaming period the material is cellular in nature and takes on a permanent set. In that condition, the material is flexible and free standing, and will maintain the same shape unless distorted by an outside force. In other words, it will not flow as does the creaming material.

The conveyor C includes a frame 10 (FIGS. 1 and 2) having one end located beneath the distribution head H. At its ends the frame 10 has horizontal end rollers 12 and 14 of substantially cylindrical configuration, and the frame 10 is slightly inclined so that the end roller 12 located near the mixing head H, that is at the feed end of the conveyor C, is slightly higher than the end roller 14 at the discharge end. The tilt is such that a plane tangent to the upper surfaces of the two rollers 12 and 14 is inclined at about 3° or less to the horizontal. Trained over these rollers 12 and 14 is a conveyor belt 16 which is flexible in the transverse direction as well as the longitudinal direction. The plastic film F rests on the upper pass of the belt 16, contacting the belt 16 along its bottom wall 2. Thus, the belt 16 supports the film F as well as the liquid reaction mixture L deposited on the film F. The end roller 14 at the discharge end of the conveyor C, that is the end located remote from the mixing head H, is powered such that the upper pass moves from the feed end to the discharge end. Adjacent to each end roller 12 and 14 the upper pass is supported on a set of idler rollers 18 (FIGS. 1 and 3) which are of cylindrical configuration and accordingly maintain the upper pass substantially in the inclined plane tangent to the upper surfaces of the end rollers 12 and 14. Between the two sets of idler rollers 18 the upper pass of the belt 16 is supported on a belt elevating mechanism 20 (FIGS. 2 and 3) which deforms the upper pass upwardly at about the location where the liquid reaction mixture begins to cream and thereafter gradually transforms it back into a planar configuration before the liquid reaction mixture takes on a permanent set and becomes the solid but flexible foam material M.

Along the sides of the belt 16, the frame 10 supports a pair of side conveyors 22 (FIGS. 1 and 2) each including a pair of vertical end rollers 24 and a side belt 26 trained around the end rollers 24. The inwardly presented pass of each side belt 26 is rigidified by a backing plate 28 mounted firmly on the frame 10. The end rollers 24 at the discharge end of the conveyor C are powered and are driven such that the upper pass of the conveyor belt 16 and the inner pass of the side belts 26 travel at the same lineal velocity and in the same direction. The sidewalls 4 of the plastic film F bear against the inner passes of the two side belts 26 and are prevented by those side belts 26 from being folded outwardly under the lateral forces exerted by the liquid reaction mixture L.

The belt elevating mechanism 20 (FIGS. 1-3) is mounted on the frame 10 and is positioned to elevate the midportion of the belt 16 in such a manner as to offset the tendency of the liquid reaction mixture L to foam into a crown-shaped configuration. In particular, the elevating mechanism 20 includes a first elevating roller 30 which is centered between the sides of the belt 16 and is mounted for rotation on a horizontal axle 32 which in turn rotates in bearings carried by the frame 10. The roller 30 bears against the underside of the belt 16 and elevates the center thereof at about the location where the liquid reaction mixture begins to cream or foam.

The elevating mechanism 20 further includes a roller 34 and a pair of smaller rollers 36 which are mounted on a common horizontal axle 38 located immediately beyond the axle 32. The roller 34 is about the same diameter as the roller 30 and is likewise centered between the sides of the belt 16. Consequently, it aligns with the roller 30. The roller 34 however is positioned slightly higher than the roller 30 so as to further elevate the center portion of the belt 16 to an elevation greater than that created by the roller 30. The rollers 36 are on each side of the roller 34 and are slightly smaller in diameter than the roller 34. They also elevate the portion of the belt 16 passing over them and thereby prevent the belt 16 from dropping off too severly at the sides of the roller 34. The rollers 34 and 36 have circumferential grooves in their peripheries.

In addition to the foregoing sets of rollers and axles, the elevating mechanism 20 includes still another roller-axle set composed of three large rollers 40 and a pair of smaller rollers 42 all on a common axle 44 which is likewise journaled in bearings mounted on the frame 10. The large rollers 40 are about the same diameter as the roller 34 which precedes them and one is aligned with the roller 34. The other two rollers 40 align with the smaller rollers 36 on the axle 38. Each of rollers 40 has an outwardly opening circumferential groove in its periphery. The rollers 40 extend up to approximately the same elevation as the roller 34 or slightly higher and maintain the center portion of the belt 16 in an elevated condition. Indeed, the outermost of the three rollers 40 elevate the belt 16 still higher than the rollers 36 which align with and precede them (FIG. 3). The smaller rollers 42 are located to the sides of the two outermost large rollers 40 and likewise support the belt 16 in an elevated position, preventing it from dropping off too sharply to the sides of the large rollers 40.

The peripheral grooves in the large rollers 40 of the axle 44 align with the peripheral grooves in the rollers 34 and 36 of the axle 38 which precedes the axle 44 and these aligned grooves receive three V-belts 46. Thus, the portion of the belt 16 between the rollers 34 and 36 of the axle 38 and the rollers 40 of the axle 44 is supported in the elevated position by the V-belts 46.

The rollers 30, 34, 36, 40 and 42 are arranged such that they create a V- or wedge-shaped deformation 47 in the belt 16 with the apex of the V being at about the location where the liquid reaction mixture L begins to cream or foam (FIGS. 2 and 3). The apex is, of course, created by the leading roller 30.

Finally, the elevating mechanism 20 includes a skid plate 48 located immediately beyond the axle 44 and the rollers 40 and 42 thereon. The skid plate 48 is generally planar and extends the entire width of the conveyor belt 16. However, along its leading end its sides are cut away and turned downwardly at an oblique angle to accommodate the terminal portion of the V-shaped deformation 47 created in the belt 16 by the rollers 30, 34, 36, 40 and 42. The leading end of the skid plate 48 that is the end adjacent to the rollers 40 and 42, is at the elevation of the uppermost portions of the rollers 40, except for the downwardly turned portions at the sides thereof. The skid plate 48 slopes downwardly from its leading end, and its terminal end is located adjacent to the set of idler rollers 18 leading up to the end roller 14 at the far end of the conveyor C.

The axles 32, 38, 44 as well as the skid plate 48 are all adjustable in the vertical direction to precisely control the amount of elevation and the inclination of the V-shaped deformation 47 imparted to the belt 16 and film F by the elevating mechanism 20.

The lower pass of the conveyor belt 16 pass through slack take-up mechanism 49 (FIG. 1) which is adjustable for eliminating any looseness in the conveyor belt 16.

OPERATION

The flexible plastic film F is fed onto the belt 20 near the end roller 12 (FIG. 1), and thus the film F is carried along the entire length of the upper pass. The film F is supplied in a roll and is, of course, withdrawn from the roll in a planar configuration. However, as the film F passes onto the belt 20 it assumes a trough-like configuration in which case it has the bottom wall 2 and the two sidewalls 4. The bottom wall 2 rests on and moves with the upper pass of the conveyor belt 16, while the sidewalls 4 are positioned adjacent to and move along with the inner passes of the side belts 26. Once the plastic film F is properly positioned against the belts 20 and 26 which shape it, the mixing head H is opened and the liquid reaction mixture L is allowed to flow onto the plastic film F. It is desirable to have the mixing head H move back and forth across the film F, for this achieves a better distribution of the liquid reaction mixture L over the bottom wall 2 of the plastic film F. The sidewalls 4 of the film F confine the liquid reaction mixture L in the lateral direction, while the downward inclination of the belt 16 coupled with its movement prevent the liquid reaction mixture L from flowing rearwardly beyond the mixing head H. The liquid reaction mixture L is applied to the belt 20 in the liquid state and remains in that state for about 3 to 5 seconds. After about 3 to 5 seconds the liquid reaction mixture L begins to cream, that is, it begins to change into a foam, yet still possesses flow characteristics. Moreover, it takes the belt 16 about 2–5 seconds to move from the mixing head H to the apex of the V-shaped deformation 47 in the conveyor belt 16 so that just as the center of the belt 16 begins to rise the liquid reaction mixture begins to cream. The V-shaped deformation 47 in the conveyor belt 16, of course, creates a corresponding deformation in the bottom wall 2 of the plastic film F, and this deformation 47 causes the creaming reaction mixture to flow outwardly toward the sidewalls 4 of the film F. Thus, more of creaming mixture is disposed to the sides of the mold formed by the plastic film F, than in the center, and as a result the reaction mixture at the sides expands to a greater height than would otherwise be the case. The creaming or foaming continues throughout the entire length of the V-shaped deformation 47. As the belt 16 and film F pass over the skid plate 48 and assume a planar configuration, the creaming reaction mixture L reaches its full gel strength, that is it takes on a full set.

Due to the initial elevation of the center of the conveyor belt 16 and film F and the subsequent elevation of the remainder of the belt as a result of V-shaped deformation 47 created by the rollers 30, 34, 36, 40 and 42, the reaction mixture L tends to rise about the same at its sides as at its center so that when the belt 16 and film F again assume their normal flat configuration on the skid plate 48, the top of the foamed mass is about flat. Since the foamed mass reaches its full gel strength after the conveyor belt 16 has passed onto the planar skid plate 48, the resulting cellular material M has a substantially flat top.

During the initial operation of the conveyor C, the heights of the various axles 32, 38 and 44 are adjusted to impart the proper elevation and configuration to the V-shaped deformation 47 in the conveyor belt 16 and the bottom wall 2 of film F which rests upon it. That elevation and configuration is such that the bun of foam material M leaving the conveyor C will have a substantially flat top. By elevating the axles 32, 38 and 44 still more, it is possible to achieve a concave top surface on the bun, while positioning them at a height somewhat less than the height which produces the flat top configuration results in a convex or crown-shaped top surface.

MODIFICATION

Figure 9:
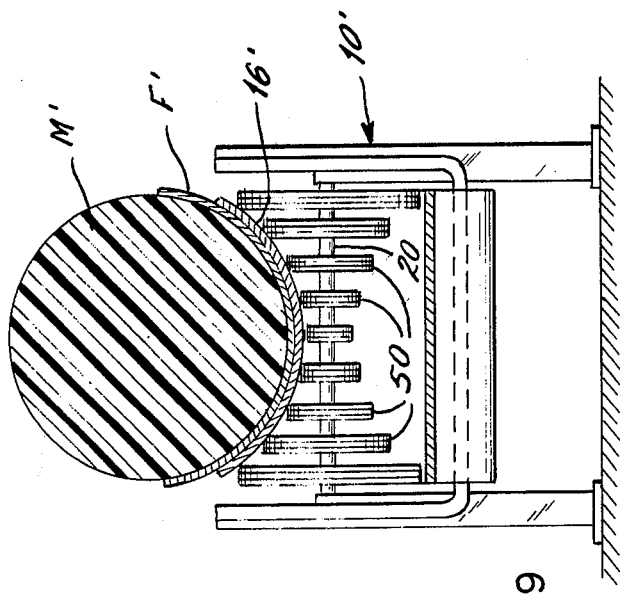
Figure 8:
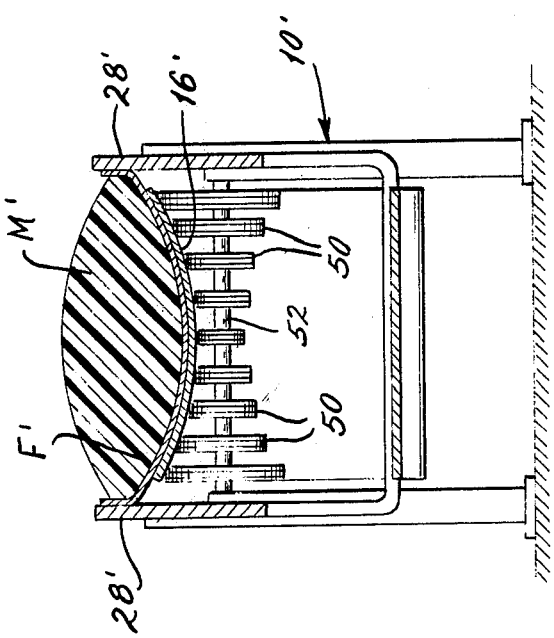

The principles of the present invention may also be unitized to form buns of foam material M' (FIGS. 4-9) of circular cross section. In particular, a modified conveyor C' has a frame 10' with end rollers 12' and 14' and side plates 28'. Trained over the end rollers 12' is a conveyor belt 16', the upper pass of which is between the side plates 28' and supports a film F' which forms a mold. Between the end rollers 12' and 14' the upper pass is supported on a series of shaping rollers 50 mounted on axles 52. The shaping rollers 50 on the first axle 52, that is the axle 52 at the feed end of the conveyor C' are all about the same diameter and maintain the belt 16' in a generally flat disposition. This axle is located beneath the mixing head H. The shaping rollers 50 on the next several axles 52 are likewise about the same diameter so that the portion of the film F' on which the liquid reaction mixture L is dispersed is generally flat although inclined downwardly toward the end roller 14' at no more than 3°. The center rollers 50 on the subsequent axles 52 are about the same diameter as the rollers 50 on the first several axles 52. However, on each subsequent axle 52, the rollers 50 become progressively greater in diameter toward the side plates 28' located at the side of the conveyor frame 10'. Moreover, the degree of change in diameter increases with each succeeding axle 52 so that the diameter of the outermost rollers 50 on the axle 52 located adjacent to the end rollers 14' is greater than the diameter of the outermost rollers 50 on an axle 52 located midway between end rollers 12' and 14' (FIGS. 6–9). Thus, the upper pass of the belt 16' initially has a flat configuration and thereafter assumes a concave configuration with the concavity becoming progressively greater toward the discharge end. The film F' which is supported by the belt 16' initially has a well-defined three-sided configuration with a bottom wall 2' against the belt 16' and sidewalls 4' against the side plates 28', but this configuration gradually merges into a concave shape which exists for the remainder of the upper pass on the belt 16'.

In use, the flexible film F' is supported and moved by the belt 16' and the lower surface of the bun formed on that film F', of course, conforms the configuration of the belt 16'. In other words, the lower surface of the bun has a convex shape. Due to the natural tendency of the reaction mixture to rise to a greater elevation at its center than at its sides, the top surface of the bun also has a convex shape. Indeed, the tendency to form a crown is compounded by reason of the fact that the upper pass of the belt 16' becomes concave in shape before the foam material reaches its full gel strength. This causes the liquid reaction mixture to flow to the center of the conveyor C' where it foams to a height greater than it would otherwise assume on a flat belt.

Thus, it is possible to obtain buns having circular cross-sectional shapes.

The formation of the liquid reaction mixture, the speed of the belt 16' and the degree of concavity of the upper pass for the belt 16' all determine the final configuration of the bun, and the first two are varied with relative ease so that buns of different configurations may be obtained from the conveyor C'.

This invention is intended to cover all changes and modifications of the example of the invention herein chosen for purposes of the disclosure which do not constitute departures from the spirit and scope of the invention.

What is claimed is:

1. A process for producing a foamed material of rectangular shape, said process comprising: deforming an elongated flexible sheet into a continuous three-sided mold having a bottom wall and side walls, the sidewalls being upright and the bottom wall being generally undistorted between the sidewalls; moving the three-sided mold in the direction of its longitudinal axis; depositing a liquid foamable reaction mixture onto the bottom wall of the mold as the mold moves, the liquid reaction mixture being capable of expanding to a cellular condition in which it will not flow and further being capable of flowing as it expands; deforming the center portion of the bottom wall such that the center portion is at a higher elevation than the portions of the bottom wall immediately to the sides of it at the sidewalls, said deformation occurring at a location beyond the location where the liquid reaction mixture is deposited, yet at a location where the liquid reaction mixture in the mold is still capable of flowing, whereby some of the liquid reaction mixture will flow outwardly toward sidewalls; progressively broadening the deformation to transform the bottom wall into a planar configuration, the deformation in the bottom wall being such that it concentrates enough of the reaction mixture near the sidewalls to cause the reaction mixture to foam about as high at the sidewalls as midway between sidewalls, whereby the foam material located on the flat bottom wall beyond the deformation therein will possess a rectangular shape in cross-section.

2. A process according to claim 1 wherein the mold is inclined generally downwardly from the point at which the liquid foamable reaction material is poured onto it.

3. The process according to claim 2 wherein the steps of deforming the bottom wall and progressively broadening the deformation create a V-shaped deformation in the bottom wall with the apex of the V being directed toward the location at which the liquid foamable reaction mixture is deposited on the bottom wall.

4. The process according to claim 1 wherein the velocity of the moving mold in the direction of its longitudinal axis is such that approximately 2 to 5 seconds are required for the mold to move from the location where the liquid foamable mixture is deposited on it to the place where the bottom wall of the mold is deformed at its center.

5. The process according to claim 1 wherein the liquid foamable reaction mixture begins to expand into a foam approximately at the location in the mold where the bottom wall is deformed at the center thereof.

6. The process according to claim 5 wherein the liquid foamable reaction mixture continues to expand and is capable of flowing while the deformation in the bottom wall is progressively broadened, and does not reach the condition in which it will not flow until after bottom wall is transformed into a planar configuration.

7. The process according to claim 1 wherein the liquid foamable reaction mixture reaches the condition in which it does not flow after the bottom wall is transformed into a planar configuration.

8. The process according to claim 1 wherein the mold opens upwardly from between the two sidewalls and the upper surface of the liquid foamable reaction mixture is undisturbed and exposed upwardly.

9. A process for producing a foamed cellular material of generally rectangular shape, said process comprising: moving an elongated flexible sheet in the direction of its longitudinal axis; deforming the sheet into a three-sided configuration having upright sidewalls and a bottom wall so as to form a mold, the bottom wall being substantially flat and undistorted between the sidewalls; depositing a liquid foamable reaction mixture in a continuous flow on the bottom wall of the mold as the mold moves, the reaction mixture being capable undergoing a creaming action wherein it changes into a foam and its flow characteristics progressively diminish until the point at which full gel strength is reached at which point the reaction mixture becomes the cellular material of fixed shape; further deforming the fexible material at the bottom wall of the mold beyond the location where liquid reaction mixture is deposited on it and before the location where the reaction mixture reaches its full gel strength, the further deformation being V-shaped in configuration with the apex of the V creating an elevation in the bottom wall and being directed toward the location at which the liquid reaction mixture is deposited in the mold, whereby some of the reaction mixture will flow toward the sidewalls; and transforming the bottom wall of the mold into an undistorted planar configuration beyond the location of the V-shaped deformation therein.

10. The process according to claim 9 wherein the liquid foamable reaction mixture does not reach its full gel strength until after reaching the portion of the mold where the bottom wall is transformed into a planar configuration.

11. The process according to claim 10 wherein the liquid foamable reaction mixture begins to cream at approximately the location of the apex for the V-shaped deformation in the bottom wall.

* * * * *